United States Patent

[11] 3,547,451

[72] Inventors Michel Milot
Montreal, Quebec, Canada;
Pierre J. Nicolas, Lynnwood, Wash.
[21] Appl. No. 748,561
[22] Filed July 29, 1968
[45] Patented Dec. 15, 1970
[73] Assignee World Wide Corporation Ltd.
Montreal, Quebec, Canada
a part interest

[54] SEALING ARRANGEMENT
8 Claims, 3 Drawing Figs.
[52] U.S. Cl..................................................... 277/25,
123/8, 230/145
[51] Int. Cl..................................................F16k 41/00,
F16j 15/16
[50] Field of Search........................................... 277/25,
81R; 92/124; 123/8SS; 230/145

[56] References Cited
UNITED STATES PATENTS
| | | | |
|---|---|---|---|
| 2,466,389 | 4/1949 | Davis............................ | 92/124 |
| 2,494,971 | 1/1950 | Summers..................... | 277/25 |

*Primary Examiner*—Samuel Rothberg
*Attorney*—Alan Swabey

ABSTRACT: A sealing means for sealing between the surfaces of a rotating and stationary member comprising a sealing element located in a slot in a rotating member. The sealing element is biased at low rotational speeds out of the slot to bear against the stationary surface. The element has an unbalanced distribution of weight so that it can be moved by centrifugal force at higher speeds of rotation within the slot to be drawn away from the stationary surface.

INVENTORS
Michel MILOT
Pierre J. NICOLAS

ATTORNEY

SEALING ARRANGEMENT

This invention relates to a sealing means, more particularly a sealing means for sealing fluid flow between the surfaces of a rotating member and a stationary member.

Many sealing means are known for use in rotary engines, pumps, compressors, turbine shafts and the like. Normally the sealing means comprise seal elements positioned in slots formed in the surface of the rotating member. The seal elements are biased outwardly from the slots to bear against the surface of the stationary member. Such sealing elements are shown, for example, in U.S. Pat. NOs. 2,466,389 and 3,300,127. These outwardly biased sealing elements have the disadvantage in that at higher speeds of rotation of the rotating member, the seals bear against the stationary member with greater pressure due to increased centrifugal force than at low rotational speeds. This causes increased wear of the seals. The effective life of the seals is thus greatly reduced due to wear in high-speed applications. The speed of rotation of rotary piston engines of the Wankel type, for example, is limited partly because at higher speeds the life and effectiveness of the sealing means used is much less due to increased wear.

It is the purpose of the present invention to provide a sealing means for machines with members rotating within a stationary member which is effective both at low-and high-speed operation while reducing the wear of the seal at high-speed operation.

The invention relates particularly to a machine having a member rotating within a stationary member and providing a fluid seal between the members, comprising a sealing means located in a slot in the rotating member, means in the slot normally biasing the sealing means out of the slot to urge it against the surface of the stationary member, the sealing means being movable in the slot against the biasing means by centrifugal force as the speed of rotation increases to urge the sealing means from the stationary surface.

The invention will now be described in detail having reference to the accompanying drawings in which.

The sealing means of the invention comprises at least one sealing element movably positioned within at least one axial slot in the surface of a rotating member with a portion of the element projecting from the slot. Means are provided which bias the sealing element to urge its projecting edge away from the slot against the surface of a stationary member to provide a relatively tight fluid seal between the surfaces of the stationary and movable members. The biasing means preferably consists of a spring located between the seal element and a wall of the slot moving the seal element within the slot to urge its sealing edge against the stationary surface. The biasing force of the spring is sufficient to provide effective sealing at low rotational speeds. The sealing edge of the seal element can be forced into contact with the stationary surface since wear is not a major problem at low rotational speeds.

The sealing element and slot are constructed so that the sealing element is movable in the slot by centrifugal force at increased rotational speeds in a manner tending to overcome the biasing force of the spring and withdraw the sealing edge toward the slot away from the stationary surface so that wear of the seal at high speeds of rotation is reduced. At higher speeds of rotation, the seal between the two members need not be as tight as at lower speeds particularly in rotary combustion engines and, therefore, the edge can be slightly withdrawn from contact with the stationary surface providing loose sealing between the members which is still sufficient for effective operation of the engine.

The seal element preferably is constructed to be pivotably or rotatably mounted within an axial slot formed on the radial surface of a rotating member with an unbalanced distribution of weight about a radial line joining the pivot point or center of rotation of the seal element to the center of rotation of the rotating member.

Figure 1:
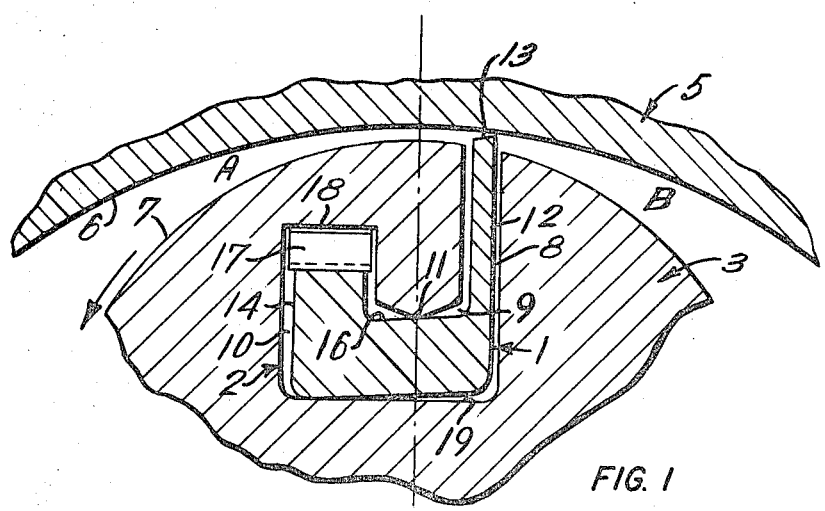
FIG. 1 illustrates one embodiment of the sealing means of this invention shown in cross section.

Referring now to the drawings, a preferred embodiment of the invention is shown in FIG. 1. The seal element 1 is pivotably mounted within an axial slot 2 formed in a member 3 which rotates about an axis 4 as indicated by the arrow.

The sealing element 1 provides a seal between a stationary member 5 and the rotating member 3 preventing or inhibiting the flow of fluid between chambers A and B, said chambers being formed by the surfaces 6 and 7 of the stationary and rotating members. The slot 2 extends longitudinally across the entire width of the radial surface of the rotating member 3. The slot 2 is shaped generally the same in cross section as the cross-sectional shape of the seal. As shown in FIG. 1, the slot 2 has a generally J-shaped cross section. The slot comprises a narrow opening 8 which extends radially outward to the surface 7 of the rotating member. The bottom of the radial opening is connected through a short laterally extending passageway 9 to an enlarged chamber 10, the chamber being offset from the slot. A pivot edge 11 is formed in the outer wall of the connecting passageway facing the axis of rotation 4 of the rotating member.

The seal element 1 is similarly J-shaped in cross section to loosely fit within the slot 2 and movable to a limited extent therein without binding. The seal has a narrow elongated sealing arm 12 extending radially out through the opening 8, the outer edge 13 of which can be urged against the surface 6 of the stationary member 5. THe seal element also has an enlarged base 14 substantially filling chamber 10 and which is connected by an intermediate portion 16 loosely passing through passageway 9 to the bottom of the arm 12. The seal element 1 fits loosely within the slot to be movable about pivot edge 11 which faces the intermediate portion 16. With the base 14 being larger than the arm 12, the seal has an unbalanced distribution of weight about pivot edge 11. A spring 17 is positioned between the outer wall 18 of the chamber 10 and the base 14 to normally bias the seal element about the pivot edge 11 to force the edge 13 of arm 12 against the surface of the stationary member. This spring 17 is preferably of flat sinusoidal shape extending the length of the slot across the width of the rotating member.

During low speed rotation of the member 3, the spring 17 is constructed to exert sufficient force on the base 14 of the seal element 1 to cause it to pivot about edge 11 and force the edge 13 against the stationary surface 6 to seal between the two chambers A and B. As the rotational speed of the member 3 increases, increased centrifugal force causes the heavier base 14 to move radially outwardly toward the wall 18 of the chamber 10 against the force of the spring. This causes the seal to pivot about edge 11 moving the lighter arm 12 and thus edge 13 radially inwardly away from the stationary surface 6 to reduce wear of the seal element.

At low rotational speeds, the difference in weight between the base 14 and arm 12 about pivot edge 11 is not sufficient to have the centrifugal force overcome the biasing force of the spring which urges the edge 13 against the stationary surface. At low rotational speeds, the distance the edge 13 is moved away from the slot toward the stationary surface by the force of the spring 17 is limited by the base hitting the radially inner wall 19 of the chamber.

Figure 2:
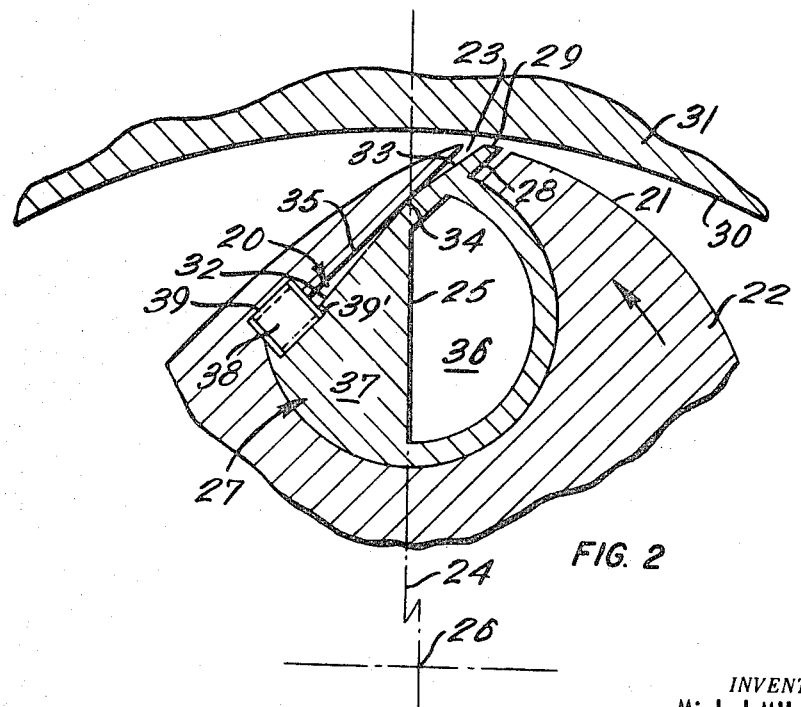
FIG. 2 illustrates a second embodiment of the sealing means shown in cross section.

FIG. 2 shows a second embodiment of the sealing means rotatably mounted within a slot on a rotating member. In this embodiment, the axial slot 20 extends across the width of the surface 21 of the rotating member 22 and has a shape of a truncated cylinder. A narrow opening 23, connecting the slot 20 to the surface 21, extends in the same direction as the truncating plane. The truncated plane forms a wall 35 of the slot which extends at an angle to a radial line 24 joining the central axis 25 of the cylinder shape to the axis of rotation 26 of the member 22. The sealing element 27 also has a substantially truncated cylindrical shape to rotatably fit within the slot. A projection 28 extends from the element through the opening 23 with its free edge 29 urged against the surface 30 of a stationary member 31. The seal element has two flat surfaces 32, 33, extending at a slight angle to each other and joined at a pivot edge 34 located on the radial line 24. The surfaces 32, 33 are angled with respect to each other to provide clearance between the surfaces and the flat wall 35 of the slot allowing the seal element to pivot with respect to the wall 35 of the slot about edge 34. A cavity 36 is formed in the sealing element 27 thus providing the sealing element with a relatively heavy offset base 37 on one side of pivot edge 34 opposite the projection 28 extending through the opening 23. A flat sinusoidal spring 38 located in a notch 39 in the wall 35 of the slot and laterally spaced from pivot edge 34 bears against a notch 39' in base 37 tending to rotatably bias the sealing element within the slot in a counterclockwise direction about edge 34 thus urging the edge 29 of the projection out against the stationary surface to provide a seal. As the rotational speed of the member 22 is increased, centrifugal force causes the heavy base 37 to move radially outward clockwise about edge 34 thus rotating the edge 29 of the projection away from the stationary surface to reduce wear.

Figure 3:
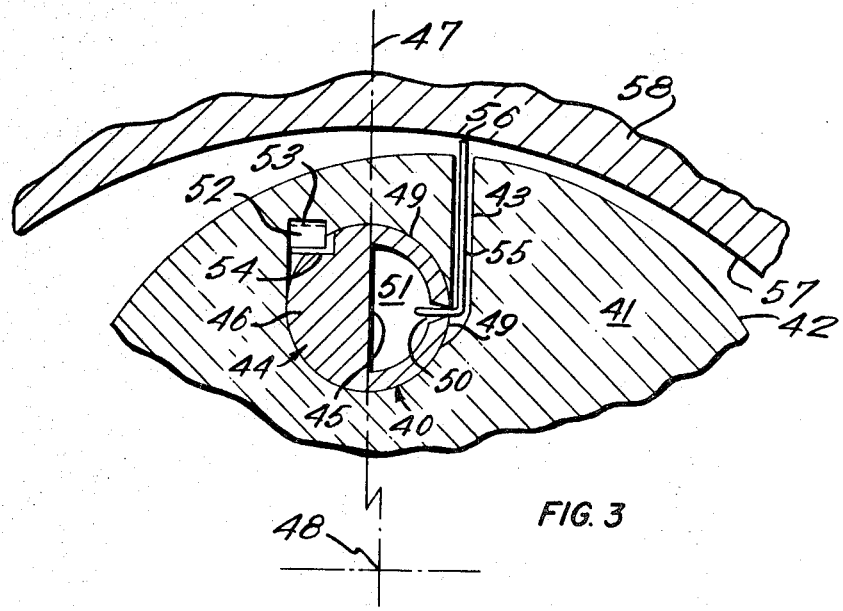
FIG. 3 illustrates a further embodiment of the sealing means shown in cross section.

A further embodiment of a sealing element is shown in FIG. 3 wherein an axially extending cylindrical slot 40 is formed in the rotating member 41 adjacent its surface 42 with a narrow elongated opening 43 extending tangentially from the slot in a radial direction to the surface 42 of the rotating member. Mounted loosely within the slot 40 is a cylindrical seal element 44 rotatable about an axis 45. The seal element 44 includes a solid semicircular base portion 46 located on one side of a radial line 47 joining the axis 45 of the element to the axis of rotation 48 of the rotatable member and opposite to the opening 43. Arms 49 extend from the base in the form of arcs to provide a circular periphery to the seal element. The free ends of the arms define a radial opening 50 adjacent the tangent point between the narrow opening 43 and the slot 40. The arms substantially enclose a cavity 51 within the seal element 44. The seal element is thus unbalanced in weight about the radial line 47 joining the central axis 45 of the slot to the axis of rotation 48 of the rotating member. A spring 52 positioned in a notch 53 in the wall of the slot and laterally spaced from the radial line 47 bears against a groove 54 formed in the base 46 of the seal element. A seal strip 55 held at one end between the arms 49 to the seal element extends through and out of the elongated narrow opening 43. Its free end 56 can be urged against the surface 57 of the stationary member 58. During low rotational speeds of the member 41, the spring 52 tends to rotate the sealing element in a counterclockwise direction about the axis 45 urging the free edge 56 of the sealing strip 55 against the surface 57 of the stationary member 58 to provide a tight seal. As the rotational speed increases, centrifugal force urges the heavy base 46 to move radially outwardly against the force of the spring thus rotating the sealing element in a clockwise direction about axis 45 and withdrawing the edge of the sealing strip 55 from engagement with the stationary surface to reduce wear.

In the embodiments shown in FIGS. 1, 2 and 3, the sealing element has an unbalanced weight distribution about a pivot point or axis of rotation. Therefore, centrifugal force acting on the sealing element at increasing rotational speeds causes the heavier base to move radially outwardly and the sealing edge connected to it to move radially inwardly.

The uneven weight distribution can be achieved by providing a difference in volume of material of the seal on either side of the pivot edge or rotatable axis of the seal as shown in FIGS. 1, 2 or 3. However, the seal can also be constructed to have an uneven weight distribution using materials with different densities. It will be obvious that other shapes or configurations can be used, provided that the sealing element is movably arranged within the slot with an unbalanced distribution of weight to allow centrifugal force to move it within the slot.

It will be obvious that the sealing means can be used in many adaptations where sealing is required between a rotary member and a stationary surface. Such applications would include rotary engines, compressors, turbines, pumps.

We claim:

1. A machine having a member rotating within a stationary member and means providing a fluid seal between the members, comprising:
    a sealing means pivotably or rotatably positioned in a slot in the rotating member, the sealing means having an unbalanced distribution of weight about a line joining the center of the pivot or rotational axis of the sealing means to the center of rotation of the rotating member;
    means in the slot urging the sealing means to pivot or rotate against the stationary member; and
    the sealing means being pivotable or rotatable in the slot against the force of the urging means by centrifugal force as the rotational speed of the number increases to urge the sealing means away from the stationary member.

2. A machine having a member rotating within a stationary member and means providing a fluid seal between the members, comprising:
    a sealing element including a base and a sealing arm, lighter in weight than the base, connected to the base;
    mounting the sealing element for pivotable movement within an axial slot in the rotating member about a pivot located between the base and sealing arm; and
    means in the slot acting on the base to move the element about the pivot to urge the sealing arm against the stationary member.

3. A machine as claimed in claim 2 wherein the means in the slot acting on the base comprises a spring located between a wall of the slot and base urging the base radially inwardly toward the axis of rotation of the rotating member about the pivot.

4. Machine as claimed in claim 3 wherein the slot comprises an elongate radially extending channel opening at one end at the surface of the rotating member, a laterally offset enlarged chamber and a connecting passageway between the chamber and the other end of the channel, an edge in the outer radial wall of the passageway forming the pivot, the base of the sealing element located in the chamber and the sealing arm extending out of the channel toward the stationary member.

5. A machine as claimed in claim 2 wherein the sealing element comprises a substantially truncated cylinder with an edge formed on the truncated surface of the cylinder to provide the pivot bearing on a wall of the slot about which the element rotates.

6. A machine as claimed in claim 5 wherein the sealing arm comprises a projection extending from the sealing element outwardly through an opening connecting the slot to the surface of the rotating member, the projection extending at an angle to a radial line of the rotating member and substantially parallel with the truncated surface.

7. A machine as claimed in claim 6 wherein the sealing element is partially hollow to form the base located on the side of the pivot edge opposite to the projection.

8. A machine having a member rotating within a stationary member and means providing a fluid seal between the members, comprising:
    a sealing element including a substantially semicylindrical base rotatable about a central axis within a cylindrical slot in the rotating member and a sealing strip, lighter in weight than the base, connected to the base and extending through a radial channel intersecting the slot tangentially and connecting the slot to the surface of the rotating member; and
    means within the slot acting on the base tending to rotate the base about the axis of the slot and thus urge the sealing strip toward the stationary member.